(12) United States Patent
Marotzke et al.

(10) Patent No.: US 12,113,909 B2
(45) Date of Patent: Oct. 8, 2024

(54) METHOD AND ELECTRONIC DEVICE FOR DECRYPTING HOMOMORPHICALLY ENCRYPTED DATA

(71) Applicant: NXP B.V., Eindhoven (NL)

(72) Inventors: Adrian Marotzke, Hamburg (DE); Leonard Clemens Püttjer, Hamburg (DE)

(73) Assignee: NXP B.V., Eindhoven (NL)

( * ) Notice: Subject to any disclaimer, the term of this patent is extended or adjusted under 35 U.S.C. 154(b) by 362 days.

(21) Appl. No.: 17/661,056

(22) Filed: Apr. 28, 2022

(65) Prior Publication Data

US 2023/0353376 A1    Nov. 2, 2023

(51) Int. Cl.
| | |
|---|---|
| G06F 21/56 | (2013.01) |
| H04L 9/00 | (2022.01) |
| H04L 9/08 | (2006.01) |
| H04L 9/32 | (2006.01) |

(52) U.S. Cl.
CPC ............ *H04L 9/3242* (2013.01); *H04L 9/008* (2013.01); *H04L 9/085* (2013.01); *H04L 9/3213* (2013.01); *H04L 9/3228* (2013.01)

(58) Field of Classification Search
None
See application file for complete search history.

(56) References Cited

U.S. PATENT DOCUMENTS

| | | | |
|---|---|---|---|
| 8,281,375 B2 | 10/2012 | von Krogh | |
| 9,373,001 B2 * | 6/2016 | Cidon | ................... G06F 21/602 |
| 10,181,049 B1 * | 1/2019 | El Defrawy | ............ H04L 9/085 |
| 10,298,385 B2 | 5/2019 | Khedr et al. | |
| 10,326,598 B2 | 6/2019 | Chabanne et al. | |
| 10,594,472 B2 | 3/2020 | Ding | |
| 2013/0339722 A1 * | 12/2013 | Krendelev | .............. H04L 9/008 |
| | | | 713/150 |

(Continued)

FOREIGN PATENT DOCUMENTS

| | | | |
|---|---|---|---|
| KR | 20170053063 A | | 5/2017 |
| WO | 2020248079 A1 | | 12/2020 |

OTHER PUBLICATIONS

Masters, Oliver, et al.; "Towards a Homomorphic Machine Learning Big Data Pipeline for the Financial Services Sector"; IBM Research; Report No. https://eprint.iacr.org/2019/1113; Sep. 2019.

(Continued)

*Primary Examiner* — William J. Goodchild

(57) ABSTRACT

A method and electronic device are provided for decrypting homomorphically encrypted (HE) data. The method may include generating, in the electronic device, result metadata that specifies a size of the HE data to be decrypted. The electronic device generates or collects HE input data and the result metadata. The HE input data and the encrypted result metadata are transmitted to a cloud server in a cloud environment to allow the cloud server to perform computations using the HE input data. The cloud server is enabled by the hardware device to send a result of the computations on the HE input data to a secure element (SE) for decryption. A relatively secure online connection is established to the SE in the cloud environment. The SE is enabled by the electronic device to decrypt the result of the computations on the HE input data as specified by the result metadata.

20 Claims, 3 Drawing Sheets

(56) References Cited

U.S. PATENT DOCUMENTS

| | | | |
|---|---|---|---|
| 2016/0105402 A1* | 4/2016 | Soon-Shiong | G16Z 99/00 |
| | | | 713/164 |
| 2017/0242961 A1* | 8/2017 | Shukla | G16B 50/00 |
| 2018/0048459 A1* | 2/2018 | Ding | G06F 21/575 |
| 2018/0204281 A1* | 7/2018 | Painter | G06Q 30/0641 |
| 2020/0177557 A1* | 6/2020 | Tzur-David | H04L 63/0435 |
| 2022/0078023 A1* | 3/2022 | Nicolas | G06F 21/602 |

OTHER PUBLICATIONS

NXP; "The Morals of Algorithms, A Contribution to the Ethics of AI Systems"; Document No. AIETHICSWP REV3; Oct. 6, 2020.
O'Brien, Chris; "IBM Bets Homomorphic Encryption is Ready to Deliver Stronger Data Security for Early Adopters"; VentureBeat; Apr. 3, 2021; Internet: https://venturebeat.com/2021/04/03/ibm-bets-homomorphic-encryption-is-ready-to-deliver-stronger-data-security-for-early-adopters/.

\* cited by examiner

METHOD AND ELECTRONIC DEVICE FOR DECRYPTING HOMOMORPHICALLY ENCRYPTED DATA

BACKGROUND

Field

This disclosure generally relates to electronics, and more particularly, to a method and electronic device for decrypting homomorphically encrypted data.

Related Art

Homomorphic encryption (HE) is an encryption method that allows computations on encrypted content. Performing computations on encrypted content provides for strong privacy because a third party can perform computations on encrypted data without accessing the content or having to obtain decryption keys. Also, HE can be used to improve the privacy of input data, while allowing the cloud to perform machine learning on the encrypted data, thus providing significant benefits for machine learning algorithms running in the cloud, as these algorithms often require large amounts of potentially highly sensitive data.

Furthermore, the result of the HE computation is also encrypted and is generally decrypted by the device, or program on the device, storing the keys. This requires the device to be online and available to receive the results needing decryption. Additionally, a secure communication protocol is needed, and includes at least one additional round trip and more computational effort on the device side. In addition, if the device is not online, then the cloud has to wait until the device comes back online. Depending on the use case, the time period may be too long, or the communication may stall indefinitely if the device never comes back online. Another scenario where this round trip is not possible would be a device with only a one-way connection to the cloud. There are many low bandwidth internet of things (IOT) radio protocols where this is the case.

Therefore, what is needed is a method and a device to enable decryption of an HE result directly in the cloud.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
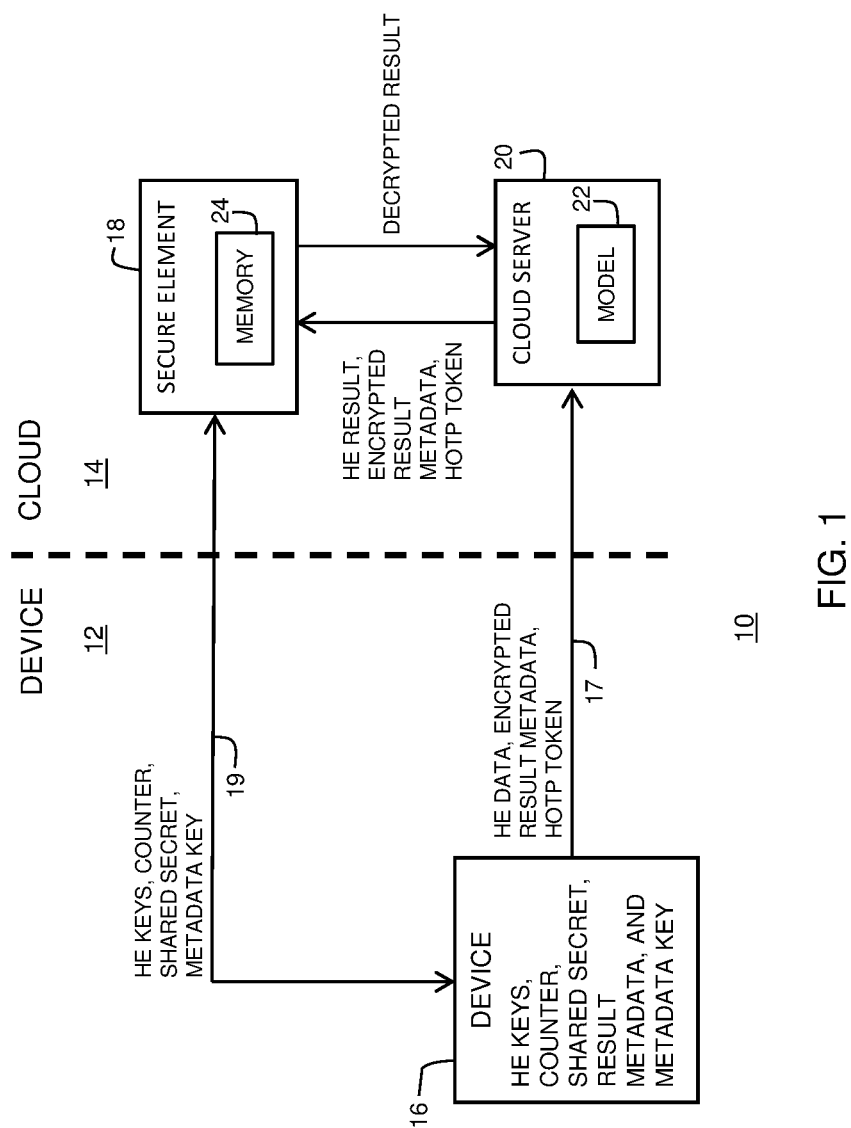
FIG. 1 illustrates a data flow between an electronic device and an entity in a cloud environment in accordance with an embodiment.

Generally, there is provided, a method and electronic device for decrypting a result of an HE computation. In one embodiment, a mechanism is provided that only allows decryption of the final result of an HE computation and prevents the cloud from decrypting other HE data. According to an embodiment, a keyed-hash message authentication code (HMAC) One-Time-Password (HOTP) token, combined with a Secure Element (SE) based secure key storage and result metadata allows, for example, a server in the cloud to only decrypt the result of the HE computation. In one embodiment, the SE is implemented in the cloud server performing the HE computation. The HOTP token is generated by the electronic device and sent with the HE data and result metadata to the cloud server. The result metadata specifies a size of the HE data to be decrypted by the secure element. The SE decrypts and authenticates the result metadata. After authorization using the HOTP token, the SE can decrypt a single HE data value having a given number of bytes as provided by the result metadata. This prevents the cloud server from requesting the SE to decrypt arbitrary HE data and allows only the result of a homomorphically encrypted computation to be decrypted.

The method is useful for machine learning algorithms implemented in the cloud. Also, the method is useful for use-cases where the cloud is not considered a fully hostile adversary, and where exposure of a single unencrypted data point is tolerable. The disclosed embodiments enhance data privacy against a (potentially) curious cloud, and against "Honest-but-Curious" multi-party-computation algorithms.

In accordance with an embodiment, there is provided, a method including: generating, in an electronic device, result metadata, wherein the result metadata specifies a size of homomorphically encrypted (HE) data to be decrypted; encrypting the result metadata; generating or collecting, by the electronic device, HE input data; transmitting the HE input data and the encrypted result metadata to a cloud server in a cloud environment to allow the cloud server to perform computations using the HE input data, and wherein the cloud server is enabled by the electronic device to send a result of the computations on the HE input data to a secure element for decryption; establishing a relatively secure online connection from the electronic device to the secure element in the cloud environment; and enabling, by the electronic device, the secure element to decrypt the result metadata and to decrypt the result of the computations on the HE input data as specified by the decrypted result metadata. The electronic device may be an edge device for an internet of things system. The secure element may decrypt the result of the computations on the HE input data using a keyed-hash message authentication code (HMAC) one time password (HOTP) token. The electronic device may generate the HOTP token by hashing a shared secret, the encrypted result metadata, and a current counter value. Generating the HOTP token may include incrementing a counter value by 1 after the HOTP token is generated. The method may further include synchronizing an HE key, a shared secret, and a counter value between the secure element and the electronic device to further enable the secure element to decrypt the result of the computations on the HE input data. The result metadata may be encrypted using a symmetric authenticated encryption scheme. After the secure element decrypts the result of the computations on the HE input data, the decrypted result of the computations may be sent to the cloud server. The secure element may be implemented as part of the cloud server. The computations on the HE input data may be performed using a machine learning model.

In accordance with another embodiment, there is provided, a method including: generating, in an electronic device, result metadata and a keyed-hash message authentication code (HMAC) one time password (HOTP) token, wherein the result metadata specifies a size of homomorphically encrypted (HE) data to be decrypted; encrypting the result metadata with a metadata key; generating or collecting, by the electronic device, HE input data; transmitting the HE input data, the encrypted result metadata, and the HOTP token to a cloud server in a cloud environment to allow the cloud server to perform computations using the HE input data, and wherein the cloud server is enabled by the electronic device to send a result of the computations on the HE input data to a secure element for decryption; establishing a relatively secure online connection to the secure element in the cloud environment; and synchronizing a HE key, a shared secret, and a counter value between the secure element and the electronic device to enable the secure element to decrypt the result metadata and to decrypt the result of the computations on the HE input data as specified by the decrypted result metadata. The secure element may be enabled by the electronic device to generate an output hash using the shared secret, the result metadata, and a current counter value, wherein the secure element is enabled by the electronic device to compare the output hash to the HOTP token, and wherein if the output hash is identical to the HOTP token, the result of the computations on the HE input data is decrypted, and if the output hash is not identical to the HOTP token, the secure element does not decrypt the result of the computations on the HE data. The current counter value may be incremented by one after the result of the computations on the HE input data is decrypted. The decrypted result of the computations on the HE input data may be provided to the cloud server. The result metadata may be encrypted using a symmetric authenticated encryption scheme. The size of the HE input data to be decrypted as specified by the result metadata may be selectable.

In accordance with yet another embodiment, there is provided, an electronic device including: a processor for generating encrypted result metadata, wherein the encrypted result metadata specifies a size of a homomorphically encrypted (HE) data to be decrypted; a data generator for generating HE input data; and a network interface for controlling transmission of the HE input data and the encrypted result metadata to a cloud server in a cloud environment, wherein the electronic device enables the cloud server to perform computations using the HE input data, and wherein the cloud server is enabled by the electronic device to send a result of the computations using the HE input data to a secure element in the cloud environment for decryption, and wherein the electronic device enables the secure element to decrypt the result of the computations using the HE input data according to the size specified by the result metadata. The secure element may decrypt the result of the computations on the HE input data using a keyed-hash message authentication code (HMAC) one time password (HOTP) token. The electronic device may generate the HOTP token by hashing a shared secret, the encrypted results metadata, and a current counter value. The result of the computations on the HE input data is generated by a machine learning model.

Storing a decryption key in the cloud is problematic, as the cloud could misuse the key to decrypt sensitive input data. The herein described embodiments prevent this by providing a mechanism that only allows decryption of the result and prevents the cloud from decrypting other HE data. FIG. 1 illustrates a data flow 10 between a device environment 12 and a cloud environment 14 in accordance with an embodiment. An electronic device 16 resides in device environment 12. Secure element 18 and cloud server 20 are shown in cloud environment 14. Secure element 18 is capable of cryptographic operations with homomorphic encryption and includes memory 24. Secure element 18 may be placed inside cloud server 20 or implemented elsewhere in cloud environment 14, as illustrated. In one embodiment, secure element 18 is a chip or co-processor that provides secure storage and allows applications to be run securely. In another embodiment, secure element 18 may be replaced with a hardware security module (HSM), a secure enclave, a trusted execution environment (TEE), or the like. Secure element 18 can also be implemented as a program or software in the cloud, or as hardware and/or software in cloud server 20. Note that reference to the "cloud" refers to internet-based computing and storage. Electronic device 16 may be any kind of device with the ability to connect to the cloud. Depending on the application, electronic device 16 may provide one-way communication or bi-directional communication to the cloud. Electronic device 16 may be, for example, a smartphone, smartcard, automotive multi-media system, an edge device in an internet of things (IOT) system such as a smart meter or a household appliance, or other device with the ability to connect to the cloud.

In one embodiment of the data flow, electronic device 16 is provisioned to securely connect to cloud server 20 via connection 17. Electronic device 16 establishes a secure bi-directional connection directly to SE 18, via connection 19 using e.g., a secure communication protocol such as for example, SCP03. Cloud server 20 is not capable of receiving information via connection 19. Using connection 19, electronic device 16 and SE 18 synchronize with each other. That is, as shown in FIG. 1, they establish a shared secret (e.g., a 128-byte random value), a shared symmetric key for metadata, a shared counter set to a random starting value, and shared keys for HE. The HE keys may be generated by either SE 18 or electronic device 16. If the shared secret is deleted on electronic device 16, or the counter on electronic device 16 is reset, then the synchronization between electronic device 16 and SE 18 is repeated.

Electronic device 16 then collects/generates the data that is evaluated by the cloud. For example, a machine learning model 22 may be implemented in cloud server 20 that provides a prediction based on input data received from electronic device 16. The input data is homomorphically encrypted by electronic device 16 and communicated to cloud server 20 via connection 17. Electronic device 16 then creates result metadata. The result metadata specifies how many bytes of the HE result produced by cloud server 20 can be decrypted and may specify other parameters for the decryption as well. The size of the HE data to be decrypted is selectable by electronic device 16. This way it is ensured that secure element 18 only decrypts as many bytes as necessary. The size and format of the result is also independent of the input data and is known by electronic device 16.

The result metadata is encrypted by electronic device 16 with the metadata key. The metadata key may be generated as part of the synchronization between electronic device 16 and SE 18. The result metadata may be encrypted using a symmetric authenticated encryption scheme, such as for example, advanced encryption standard Galois counter mode (AESGCM). Electronic device 16 then generates a keyed-hash message authentication code (HMAC) One-Time-Password (HOTP) token by hashing the shared secret, the encrypted results metadata, and the current counter value. Unlike a HOTP that is generally used for 2-factor-authentication, the length of the HOTP token generated by electronic device 16 can be the full output of the hash function used to hash the shared secret. After generating the HOTP token, electronic device 16 increments the counter by 1. In another embodiment, a different type of token may be used for the decryption.

The HE data, the encrypted results metadata and the HOTP token are then sent from electronic device 16 to cloud server 20 via connection 17 using a standard secure tunnel protocol such as transport layer security (TLS). Cloud server 20 then performs the homomorphic computation on the HE data and computes the HE result. This result, together with the result metadata and the HOTP token, is sent to SE 18 by cloud server 20. Cloud server 20 sends the HOTP token to SE 18 instead of electronic device 16 because it is not known how long the computations may take. Secure element 18 decrypts and authenticates the result metadata, and aborts if the result metadata is invalid or modified. Secure element 18 hashes the shared secret, the encrypted result metadata, and the current counter value to create an output hash. Secure element 18 then compares the output hash to the HOTP token received from cloud server 20. If they are identical, then SE 18 decrypts the HE result, returns the decrypted result to cloud server 20, and increments the counter by 1. If the HOTP token does not match the output hash, then SE 18 aborts the decryption.

Because the counter value is changed after a successful decryption, resubmitting more HE data with the same result metadata and HOTP token would cause an error. Likewise, changing the result metadata (e.g., replaying metadata from an earlier result) also causes the HOTP token and output hash to mismatch and cause an error, thus preventing additional HE data from being decrypted.

To get around the above-described decryption safeguards, the cloud server 20 can immediately, after receiving the HE data, forward a portion of the HE data to SE 18 that is of equal size and format as the computation result would be. This would be sent to SE 18 together with the result metadata and HOTP token. As the HOTP token has not been used yet, it is still valid, and SE 18 would return a decrypted result. However, cloud server 20 has no way of decrypting more data, and has no way of then decrypting the final computation result, as the token has already been used.

As mentioned above, model 22 computes predictions on HE data and the results of the predictions are also homomorphically encrypted. Model 22 may be implemented in hardware, software, or a combination of hardware and software. In one embodiment, model 22 is a machine learning model for computing predictions on input data such as for example, images or various types of input data received from sensor/data collector or generator 58 (see FIG. 3).

In most machine learning algorithms, the computed result is significantly smaller than the input data. As an example, the input data may be a 1-megapixel image, the computation may be performed using a neural network for image processing, and the result states whether a certain object is in the image. The result may be just, e.g., a 32-bit output that includes the probability that the object is in the image. In this case, the result metadata may be set to allow only 32 bits to be decrypted and returned to cloud server 20. The maximum amount of data cloud server 20 could decrypt of the image would also be 32 bits, as determined by the result metadata. This means the amount of decrypted data exposed in the unsecured cloud environment 14 is minimal. However, this would only be allowed in an application or use case where this sort of single unencrypted data point exposure is tolerable.

Figure 2:
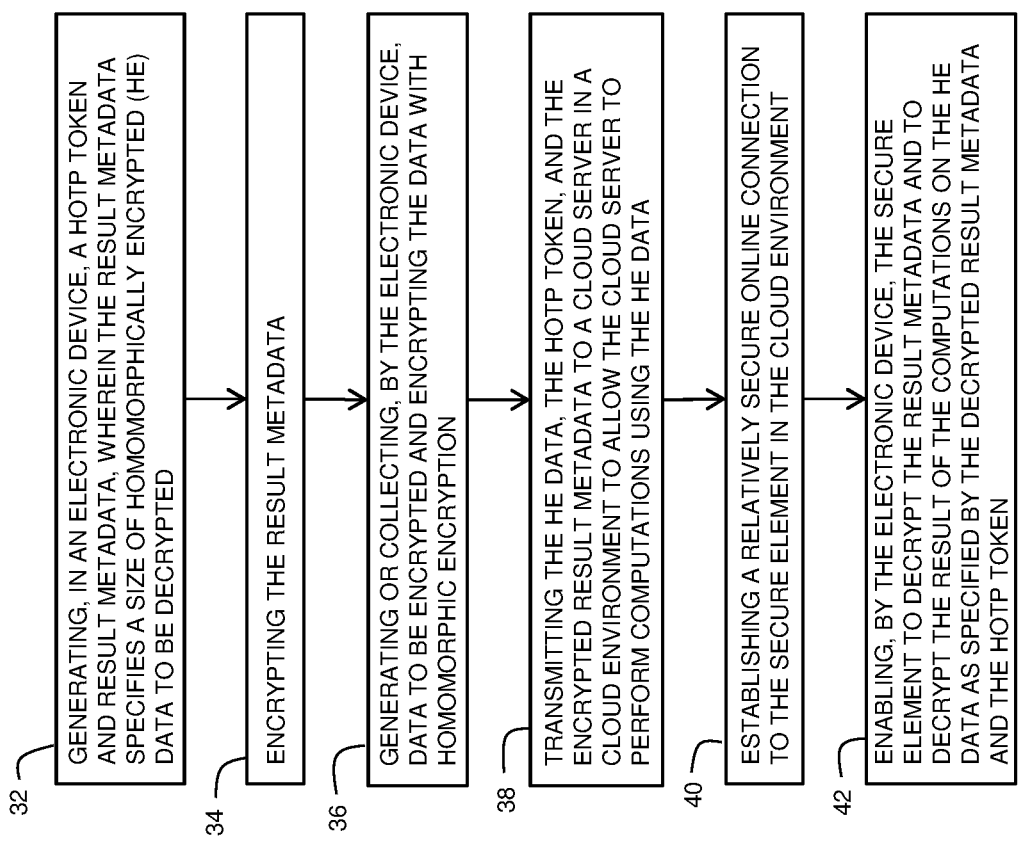
FIG. 2 illustrates a flowchart of a method for decrypting HE data in accordance with an embodiment.

FIG. 2 illustrates a flowchart of method 30 for decrypting HE data in accordance with an embodiment. For purposes of illustrating a clear example, FIG. 2 is described in the context of FIG. 1, but other embodiments may be implemented. Method 30 begins at block 32. At block 32, an electronic device, such as electronic device 16, generates result metadata and an HOTP token. The result metadata specifies a size of HE data to be decrypted. At block 34, the result metadata is encrypted by electronic device 16. The result metadata may be encrypted using any asymmetric or symmetric encryption scheme. At block 36, electronic device 16 generates or collects data to homomorphically encrypt. Electronic device 16 may be, for example, a smart meter for collecting and then transmitting information about electric power usage in a residence. The data is homomorphically encrypted by electronic device 16 to produce HE data. At block 38, the HE data, the HOTP token, and the result metadata are transmitted by electronic device 16 to cloud server 20 via connection 17. Cloud server 20 performs computations using the HE data. Cloud server 20 is enabled by electronic device 16 to send a result of the computations on the HE data to SE 18 for decryption. At block 40, a relatively secure online connection is established between electronic device 16 and secure element 18 using a secure connection protocol, such as for example, SCP03. At block 42, electronic device 16 shares a metadata key with SE 18 and enables SE 18 to decrypt the result of the computations performed by cloud server 20 on the HE data. Secure element 18 decrypts the result metadata. The result of the computations is decrypted by SE 18. The decryption is performed as specified by the result metadata and the HOTP token. That is, the result metadata specifies a size of the data that is decrypted. This limits the amount of unencrypted data exposed in the unsecure cloud environment 14.

Figure 3:
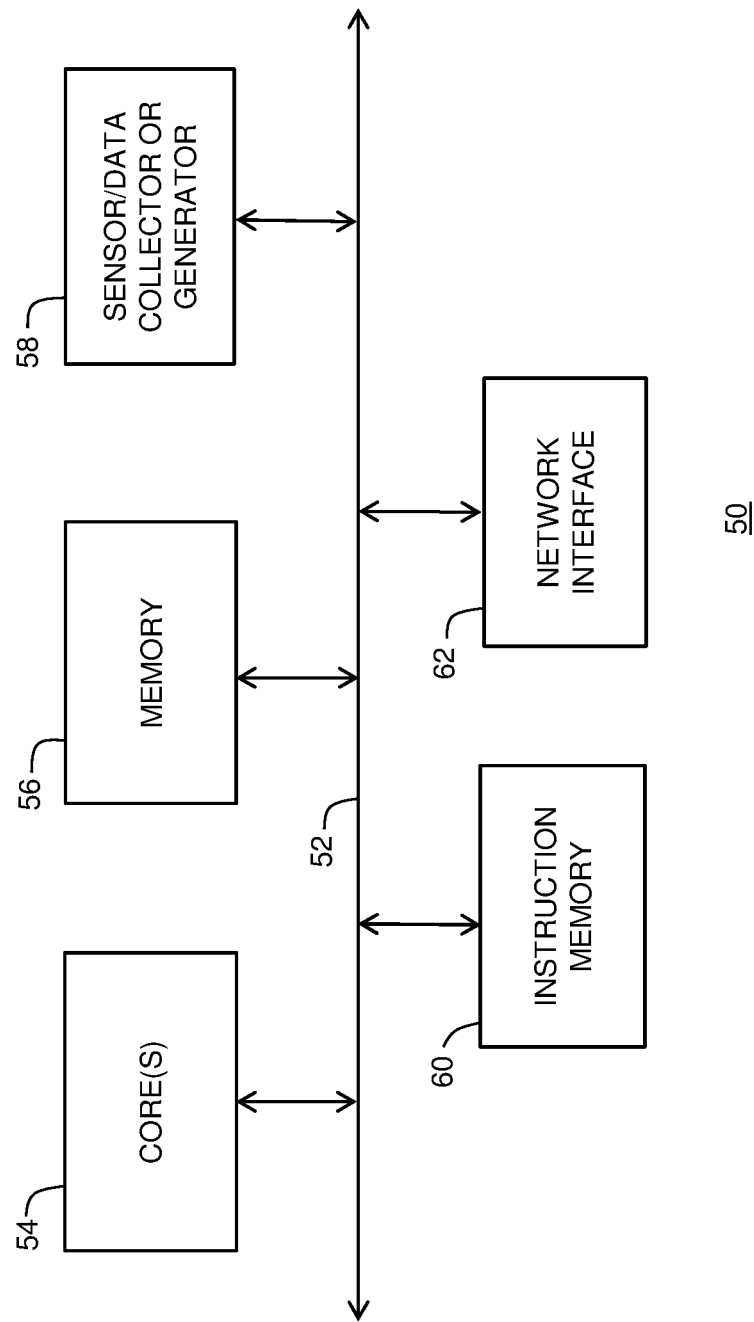
FIG. 3 illustrates a data processing system useful for implementing the electronic device of FIG. 1 in accordance with an embodiment.

FIG. 3 illustrates data processing system 50 useful for implementing an electronic device, and in particular, electronic device 16 from FIG. 1 in accordance with an embodiment. Data processing system 50 may be implemented using one or more integrated circuits and may be used in an implementation of the described embodiments. Data processing system 50 includes bus or switching network 52. Connected to bus 52 is one or more processor cores 54, memory 56, sensor/data collector or generator 58, instruction memory 60, network interface 62, and machine learning model 64. The one or more processor cores 54 may include any hardware device capable of executing instructions or commands stored in memory 56 or instruction memory 60. Processor cores 54 may be, for example, a microprocessor, field programmable gate array (FPGA), application-specific integrated circuit (ASIC), or similar device. Processor cores 54 may be implemented in a secure hardware element and may be tamper resistant. Processor cores 54 may control the operation of electronic device 16 and may also encrypt the output of sensor/data collector or generator 58 as well as designating the size of the HE data computations performed by cloud server 20.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, read only memory (ROM), or other volatile or non-volatile memory. Also, memory 56 may be implemented in a secure hardware element or other type of secure storage. Alternately, memory 56 may be a hard drive implemented externally to data processing system 50 or a register file. In one embodiment, memory 56 may be used to store input data from sensor/data collector or generator 58. Also, memory 56 may be used to store decryption results in electronic device 16.

Sensor/data collector or generator 58 collects or generates data that is homomorphically encrypted by electronic device 16. Sensor/data collector or generator 58 may be a part of data processing system 50 or a separate device coupled to data processing system 50. For example, sensor/data collector or generator 58 may be a thermometer, accelerometer, or other device that receives an input from the environment or elsewhere. In one embodiment, processor cores 54 may perform homomorphic encryption on the input data before the input data is transmitted to cloud server 20. In another embodiment, sensor/data collector or generator 58 may include additional circuitry, logic, or software for performing initial and/or intermediate computations on the HE input data before communicating the HE data to cloud server 20.

Network interface 62 may include one or more devices for enabling communication with other hardware devices, such as cloud server 20 and SE 18. For example, network interface 62 may include a secure communication protocol such as SCP03 for enabling a connection between electronic device 16 and SE 18. Also, network interface 62 may include, or be coupled to, a network interface card (NIC) configured to communicate according to the Ethernet protocol. Also, network interface 62 may implement a TCP/IP stack for communication according to the TCP/IP protocols. Input data for classification by machine learning model 22 may be transmitted via network interface 62, or similar interface, and connection 17 to cloud server 20. Various other hardware or other configurations for communicating are available.

Instruction memory 60 may include one or more non-transient machine-readable storage media for storing instructions for execution by processor cores 54. In other embodiments, both memories 56 and 60 may store data upon which processor cores 54 may operate. Memories 56 and 60 may also store, for example, encryption, decryption, and verification applications. Memories 56 and 60 may be implemented in a secure hardware element and may be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
   generating, in an electronic device, result metadata, wherein the result metadata specifies a size of homomorphically encrypted (HE) data to be decrypted;
   encrypting the result metadata;
   generating or collecting, by the electronic device, HE input data;
   transmitting the HE input data and the encrypted result metadata to a cloud server in a cloud environment to allow the cloud server to perform computations using the HE input data, and wherein the cloud server is enabled by the electronic device to send a result of the computations on the HE input data to a secure element for decryption;
   establishing a relatively secure online connection from the electronic device to the secure element in the cloud environment; and
   enabling, by the electronic device, the secure element to decrypt the result metadata and to decrypt the result of the computations on the HE input data as specified by the decrypted result metadata.

2. The method of claim 1, wherein the electronic device is an edge device for an internet of things system.

3. The method of claim 1, wherein the secure element decrypts the result of the computations on the HE input data using a keyed-hash message authentication code (HMAC) one time password (HOTP) token.

4. The method of claim 3, wherein the electronic device generates the HOTP token by hashing a shared secret, the encrypted result metadata, and a current counter value.

5. The method of claim 3, wherein generating the HOTP token includes incrementing a counter value by 1 after the HOTP token is generated.

6. The method of claim 1, further comprising synchronizing an HE key, a shared secret, and a counter value between the secure element and the electronic device to further enable the secure element to decrypt the result of the computations on the HE input data.

7. The method of claim 6, wherein the result metadata is encrypted using a symmetric authenticated encryption scheme.

8. The method of claim 1, wherein after the secure element decrypts the result of the computations on the HE input data, the decrypted result of the computations is sent to the cloud server.

9. The method of claim 1, wherein the secure element is implemented as part of the cloud server.

10. The method of claim 1, wherein the computations on the HE input data are performed using a machine learning model.

11. A method comprising:
    generating, in an electronic device, result metadata and a keyed-hash message authentication code (HMAC) one time password (HOTP) token, wherein the result metadata specifies a size of homomorphically encrypted (HE) data to be decrypted;

encrypting the result metadata with a metadata key;

generating or collecting, by the electronic device, HE input data;

transmitting the HE input data, the encrypted result metadata, and the HOTP token to a cloud server in a cloud environment to allow the cloud server to perform computations using the HE input data, and wherein the cloud server is enabled by the electronic device to send a result of the computations on the HE input data to a secure element for decryption;

establishing a relatively secure online connection to the secure element in the cloud environment; and synchronizing a HE key, a shared secret, and a counter value between the secure element and the electronic device to enable the secure element to decrypt the result metadata and to decrypt the result of the computations on the HE input data as specified by the decrypted result metadata.

12. The method of claim 11, wherein the secure element is enabled by the electronic device to generate an output hash using the shared secret, the result metadata, and a current counter value, wherein the secure element is enabled by the electronic device to compare the output hash to the HOTP token, and wherein if the output hash is identical to the HOTP token, the result of the computations on the HE input data is decrypted, and if the output hash is not identical to the HOTP token, the secure element does not decrypt the result of the computations on the HE data.

13. The method of claim 12, wherein the current counter value is incremented by one after the result of the computations on the HE input data is decrypted.

14. The method of claim 12, wherein the decrypted result of the computations on the HE input data is provided to the cloud server.

15. The method of claim 11, wherein the result metadata is encrypted using a symmetric authenticated encryption scheme.

16. The method of claim 11, wherein the size of the HE input data to be decrypted as specified by the result metadata is selectable.

17. An electronic device comprising:
a processor for generating encrypted result metadata, wherein the encrypted result metadata specifies a size of a homomorphically encrypted (HE) data to be decrypted;
a data generator for generating HE input data; and
a network interface for controlling transmission of the HE input data and the encrypted result metadata to a cloud server in a cloud environment,
wherein the electronic device enables the cloud server to perform computations using the HE input data, and wherein the cloud server is enabled by the electronic device to send a result of the computations using the HE input data to a secure element in the cloud environment for decryption, and
wherein the electronic device enables the secure element to decrypt the result of the computations using the HE input data according to the size specified by the result metadata.

18. The electronic device of claim 17, wherein the secure element decrypts the result of the computations on the HE input data using a keyed-hash message authentication code (HMAC) one time password (HOTP) token.

19. The electronic device of claim 18, wherein the electronic device generates the HOTP token by hashing a shared secret, the encrypted results metadata, and a current counter value.

20. The electronic device of claim 17, wherein the result of the computations on the HE input data is generated by a machine learning model.

* * * * *